UNITED STATES PATENT OFFICE.

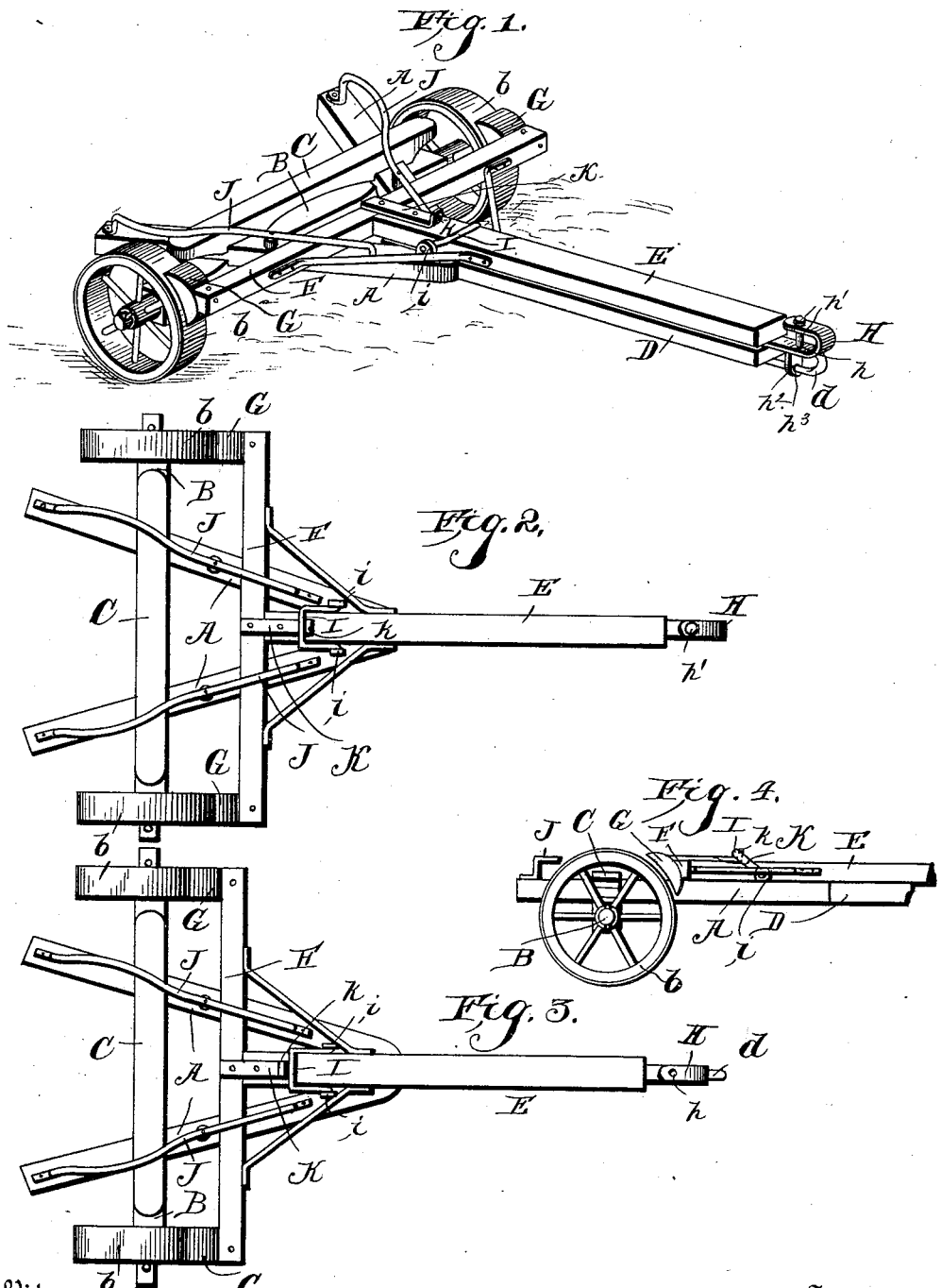

WILLIAM F. ROCHESTER, OF HICKORY FLAT, MISSISSIPPI.

VEHICLE-BRAKE.

SPECIFICATION forming part of Letters Patent No. 393,394, dated November 27, 1888.

Application filed September 17, 1888. Serial No. 285,648. (No model.)

*To all whom it may concern:*

Be it known that I, WILLIAM F. ROCHESTER, a citizen of the United States, residing at Hickory Flat, in the county of Benton and State of Mississippi, have invented new and useful Improvements in Vehicle-Brakes, of which the following is a specification.

The invention relates to improvements in vehicle-brakes, being arranged to act automatically when the vehicle runs forward toward the animal or when the latter backs, as in going downhill; and it consists in the construction and novel combination of parts hereinafter described, illustrated in the accompanying drawings, and pointed out in the appended claims.

Figure 1 of the drawings represents a perspective view of a vehicle provided with the brake mechanism embodying the invention. Fig. 2 represents a plan view of the same with the brake-shoes held out of contact with the wheels. Fig. 3 represents a similar view with the brake-shoes held in contact with the wheels. Fig. 4 is a side elevation of Fig. 2.

Referring to the drawings by letter, A designates the front hounds of a vehicle, such as a wagon; B, the front axle, having the front wheels, $b\ b$, journaled at its ends; and C, the head-block.

D is the tongue standing forward from the junction or apex of the hounds A, and having secured to its lower surface the shank of the draft-hook $d$, which preferably bends upward, as shown. A whiffletree may be attached to said draft-hook, if more than one team of draft-animals are to be attached to the vehicle.

E is the draft-bar of the brake lying upon the tongue, and having the transverse brake-bar F secured to its rear end, brake-shoes G G, of suitable construction, being secured to the ends of said brake-bar facing the wheels. The draft-bar E has secured to its front ends the upwardly and rearwardly extending draft-hook H, pivoted with the vertical openings $h$ $h$ for the insertion of a retaining-pin, $h'$, and having the depending arm $h^2$, provided with a guide perforation, $h^3$, for the insertion of the shank of the draft-hook $d$ in front of the tongue.

I is a retaining and guide loop, with its outwardly-bent ends journaled in bearings $i$, secured to the hounds, which loop straddles the draft-bar E, and also guides the same.

J J are long guide-staples, having their downwardly-turned arms secured to the hounds, which staples extend over the brake-bar and retain it down on the hounds.

K is a detent-hook having its shank secured to the middle of the upper side of the brake-bar and extending frontwardly therefrom. The said hook has an upturned point, $k$, adapted to engage in the loop I, thereby preventing the draft-bar E from sliding rearward far enough to bring the shoes to bear on the front wheels.

When the shoes are brought in contact with the wheels, they may be retained so, if desirable or necessary, by turning down the loop I in front of the point of the hook.

When using oxen or draft-animals, the yoke of the team, or of the rear team, when two are used, is attached to the draft-hook H and the pin $h'$ inserted in the openings $h\ h$. To use horses as draft-animals, singletrees of ordinary construction must be attached to the ends of the brake-bar, which then acts as a doubletree.

It is evident that when the loop I is turned frontward, should the vehicle run forward toward the animals, as might occur in going downhill, the wheels $b$ will be forced upon the brake-shoes and the motion thereby impeded. The brake will be applied also when the animals back and be released when they again begin to pull, as when starting uphill, so that the motions of the animals properly apply and release the brakes. To back the vehicle freely, the hook K must first be engaged by the loop I, as described.

Having described my invention, I claim—

1. In a vehicle, the combination of the front hounds, the front axle, the front wheels, the tongue running frontward from said hounds, and the draft-hook $d$, standing frontward from the end of the tongue, of the guide and retaining staples J, the transverse brake-bar passing under said staples, the brake-shoes on the ends of said bar, the draft-bar standing frontward from the brake-bar and lying on the tongue, and the draft-hook H, secured to the front end of said draft-bar and provided with a depending perforated guide-arm, $h^2$, that rides on the shank of the draft-hook $d$, substantially as specified.

2. In a vehicle, the combination, with the front wheels, the brake-bar, the brake-shoes secured to the ends of said bar, and the draft-bar extending frontward from the brake-bar, of the hook K, secured to the brake-bar, and the loop I, arranged to engage the said hook, and thereby prevent the brake-shoe from engaging the wheels, substantially as specified.

3. In a vehicle, the combination, with the front wheel, the brake-bar, the brake-shoes secured to the ends of said bar, and the draft-bar secured to the brake-bar, and extending thence frontward upon the tongue, of the hook K, secured to the brake-bar, and a loop, I, so situated that it prevents the shoes from engaging the wheels when it is engaged over the point of said hook and keeps the shoes engaged on the wheels when it bears on the front of the hook, substantially as specified.

In testimony that I claim the foregoing as my own I have hereto affixed my signature in presence of two witnesses.

WILLIAM F. ROCHESTER.

Witnesses:
P. C. GADD,
W. E. CRUM.